United States Patent [19]

DeLoach

[11] Patent Number: 4,906,338

[45] Date of Patent: Mar. 6, 1990

[54] METHOD AND APPARATUS FOR REMOVING VOLATILE ORGANIC CONSTITUENTS OF GASOLINE FROM GASOLINE-WATER MIXTURE, AND FROM CONTAMINATED WATER AT UNDERGROUND SITES

[76] Inventor: Walter W. DeLoach, 818 Cattlemen Rd., Sarasota, Fla. 34232

[21] Appl. No.: 105,822

[22] Filed: Oct. 8, 1987

[51] Int. Cl.[4] .......................... B01D 1/16; B01D 3/00
[52] U.S. Cl. ...................................... 203/10; 159/16.1; 159/4.04; 159/48.2; 196/115; 196/128; 196/133; 202/158; 202/236; 202/266; 202/267.1; 203/14; 203/39; 203/49; 203/86; 203/90; 208/359; 208/362; 208/369; 261/111; 261/113
[58] Field of Search .................. 203/10, 39, 14, 86, 203/40, 90, 49; 202/158, 236, 266, 267.1, 197, 201; 159/16.1, 4.04, 48.2; 261/113, 111; 208/362, 369, 359; 196/115, 128, 133, 105

[56] References Cited

U.S. PATENT DOCUMENTS

| | | | |
|---|---|---|---|
| 2,409,088 | 10/1946 | Weits et al. | 261/111 |
| 2,847,368 | 8/1958 | Worthington et al. | 203/10 |
| 2,979,156 | 4/1961 | Sebald | 261/111 |
| 3,432,399 | 3/1969 | Schutt | 203/10 |
| 3,436,315 | 4/1969 | Ackerman | 203/10 |
| 3,518,816 | 7/1970 | Jalma | 261/111 |
| 3,518,817 | 7/1970 | Dell'Agnese et al. | 261/111 |
| 3,519,054 | 7/1970 | Cavataio et al. | 159/4.04 |
| 3,815,334 | 6/1974 | Kötting et al. | 261/111 |
| 4,263,021 | 4/1981 | Downs et al. | 261/113 |
| 4,312,646 | 1/1982 | Fattinger et al. | 261/111 |
| 4,512,937 | 4/1985 | Hoffman | 261/111 |

Primary Examiner—Virginia Manoharan
Attorney, Agent, or Firm—Gifford, Groh, Sprinkle, Patmore and Anderson

[57] ABSTRACT

A method for removing the volatile constituents from gasoline and volatile organic chemicals from contaminated potable water when a fluid including gasoline-water mixture and when contaminated potable water is introduced into a vertical tower includes the steps of flowing the gasoline-water fluid and the water downward in a tower over and in contact with media trays stacked in courses in the tower. The media trays, either circular or square, fit closely within the tower inner wall, such trays are aluminum or molded plastic frames one inch by one inch angles one-eighth inch thick, with a plurality of one and one-half inch wide slats one-quarter of an inch thick on the top of the frame; the slats being spaced apart not less than one-half inch nor more than three-quarters of an inch. The stacked trays are so arranged in courses that the slats of trays of alternate courses are disposed parallel to the slats of trays in alternate courses, but the slats of intermediary trays are disposed at ninety degrees to the slats of trays in the alternate courses. A column of air flowing upward through the media trays entrains the volatile constituents released from the gasoline, and the volatile organic chemicals liberated from the water, when the fluid contacts the media in the tower. A structure for exhausting the air and entrained volatile constituents is provided, and a structure is provided for removing fluid from the bottom of the tower.

6 Claims, 1 Drawing Sheet

METHOD AND APPARATUS FOR REMOVING VOLATILE ORGANIC CONSTITUENTS OF GASOLINE FROM GASOLINE-WATER MIXTURE, AND FROM CONTAMINATED WATER AT UNDERGROUND SITES

BACKGROUND OF THE INVENTION

This invention relates to water purification and, more particularly, to the removal of the volatile constituents of gasoline from the gasoline and water found at contaminated underground sites, such as gasoline service station storage locations, and the removal of volatile organic constituents from contaminated water.

For many years, gasoline service stations have been provided with subterranean gasoline storage tanks that were and are made of steel. Such tanks, over many years of service, rust due to water condensation in such tanks, and they have begun to leak gasoline into the surrounding soil. Such a condition is serious because, in some instances, the gasoline can leach into potable water supplies and into nearby water streams and the like.

While the rusted storage tanks can be replaced easily with fiberglass tanks, the removal of the gasoline and water from the ground around the tanks has not been accomplished as easily.

It is an object of the present invention to provide an and method for removal of the volatile constituents of gasoline from the environs of the rusted and leaking gasoline storage tanks, and for eliminating the fouling characteristics of conventional media in treating such contaminated gasoline-water mixture.

In other locations, potable water sometimes becomes contaminated with dissolved volatile organic chemicals. Another object of the present invention is to provide apparatus and method for removing the volatile organic chemicals from this contaminated water.

SUMMARY OF THE INVENTION

The method for removing the volatile constituents, primarily benzene, toluene and xylene, from gasolie-water mixture and the dissolved volatile organic chemicals in potable water includes flowing such mixture, and the contaminated water, downwardly in a tower stacked with media trays supported on a platform in the tower. The media trays comprise a one-by-one inch aluminum angle frame having a plurality of one-quarter inch thick plastic slats, one and one-half inches wide, secured to the top, and spaced apart not less than one-half inch nor more than three-quarters inch from adjacent slats.

In some instances the media tray may be a molded plastic unit having the same dimensions as the aluminum frame and plastic slats.

The media trays, either circular or square, fit close to the inner surface of the tower and a stream of air flows upwardly counter to the downward flow of the gasoline-water mixture and the flow of the contaminated potable water. The released volatile constituents of the gasoline, and the volatile chemicals released from the water, are entrained in the air and are removed from the tower for disposal in accordance with local, State and Federal regulations.

The many other objects, features and advantages of the present invention will become apparent to those skilled in the art when the following description of the best modes contemplated at present for practicing the invention are read in conjunction with the accompanying drawing, wherein like reference numerals refer to like or equivalent parts.

DETAILED DESCRIPTION

Figure 1:
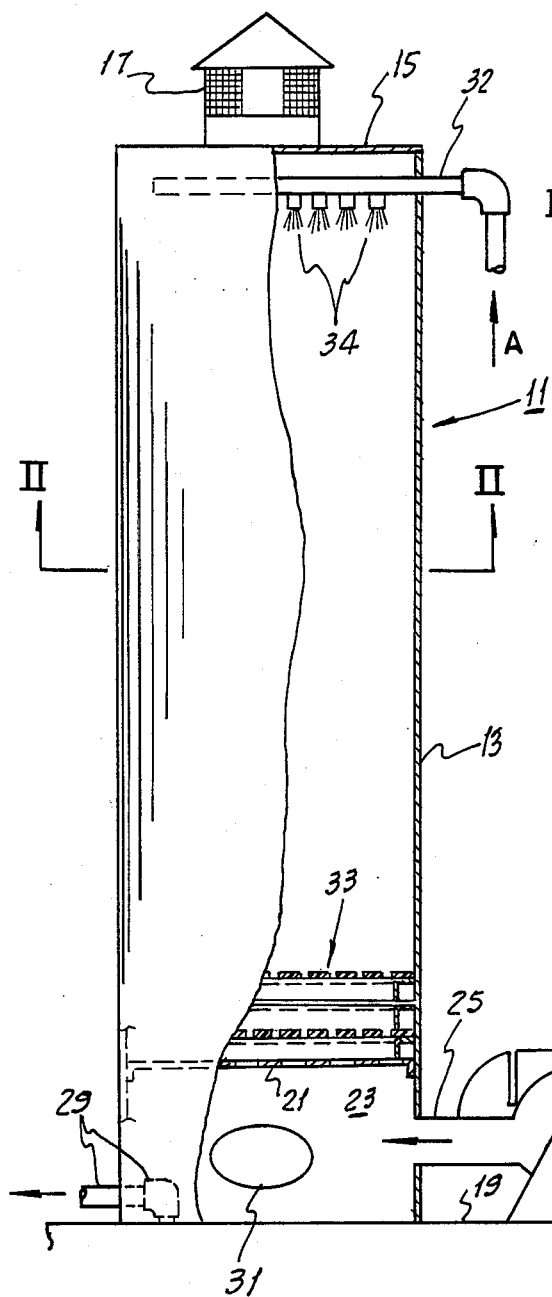
FIG. 1 is a schematic elevational view of a tower including media trays in accordance with the present invention as used in practicing the method of the present invention.

Referring to FIG. 1, a tower 11 in accordance with the present invention includes, in one instance, a cylindrical shell 13 having a top 15 and an exhaust cupola 17 on the top 15. The tower 11 is supported on a concrete base 19 in a conventional manner. The tower 11 is made, preferably, of aluminum, fiberglass or stainless steel.

Within the tower 11, in the lower portion, is a perforated metal support platform 21 that is secured to the shell 13 in a suitable manner. The support platform is spaced above the base 19 a short distance, thereby creating a plenum 23 between the base 19 and the support platform 21. Entering the plenum 23 is a duct 25 carrying air from a blower 27 mounted on the base 19 to bring air into the plenum 23 thereby fluidly interconnecting the blower 27 with the plenum 23. The perforations in the perforated metal support platform 21 allow fluid communication between the plenum 23 and the support platform 21 provided at the approximate lower end of the tower 11. A conduit 29, disposed in the plenum 23, extends through the shell 13, and is thereby adaptable for connection to a hose, or the like (not shown), to remove any fluid or precipitate that collects in the plenum 23 while the method of the present invention is being practiced. An access opening or manhole 31 is also provided in the shell 13 to admit workmen, when necessary, to remove solid matter from the plenum 23.

At the top of the tower, and just below the top 15, is a conduit 32, extending transversely across the tower 11, that carries a plurality of spray nozzles 34. The conduit 32 carries the gasoline-water mixture and the contaminated potable water flowing in the direction of the arrow A, and the nozzles emit the fluid mixture and the water as a spray over a plurality of media trays 33 stacked in the tower 11.

Figure 2:
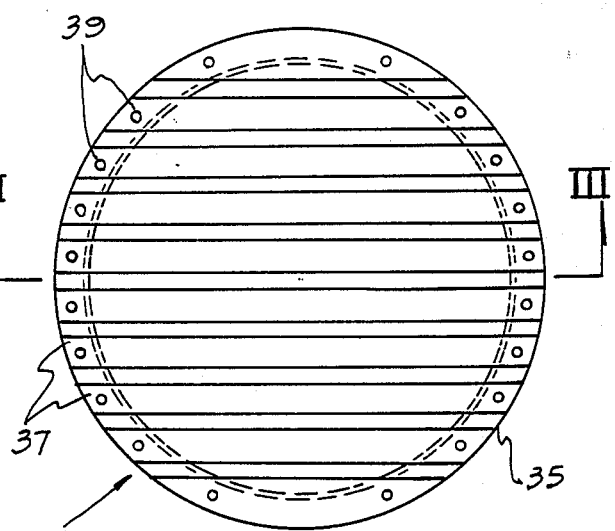
FIG. 2 is a schematic plan view of one media tray in accordance with the present invention, such media tray being used in a cylindrical tower such as that shown in FIG. 1.
Figure 3:
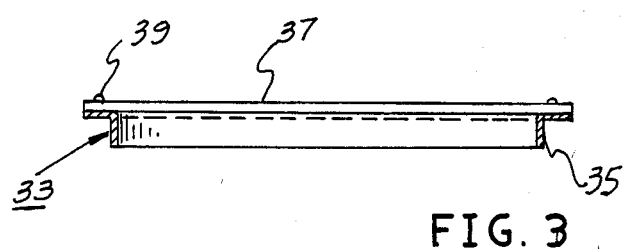
FIG. 3 is a cross-sectional view along line III—III of FIG. 2.

FIGS. 2 and 3 illustrate a media tray 33 that is used in a cylindrical tower, like tower 11. The media tray 33 comprises a circular frame 35 made from a one inch by one inch aluminum angle that is one-eighth inch thick. Fastened to the top of the aluminum angle frame 35 are a plurality of plastic slats 37 that are one and one-half inches wide, one-quarter inch thick, spaced apart not less than one-half inch nor more than three-quarters of an inch. The slats 37 are secured to the angle frame 35 by means of screws 39, or in any other suitable manner.

The top surface of each slat 37 is slightly convex so that fluids will not lay thereon when the tower 11 is not in use.

In some instances, the media tray 33 may be a molded plastic tray including the angle frame and slats as a unit.

Figure 4:
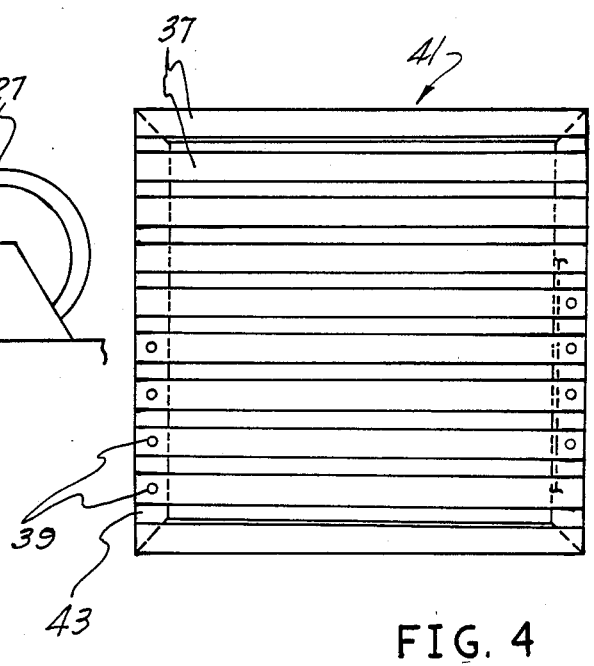
FIG. 4 is a schematic view of another media tray in accordance with the present invention, such media tray being used in a tower like that of FIG. 1, but having a rectangular cross-section.

FIG. 4 illustrates another media tray 41 that is square in shape. It, too, is a frame 43 constructed of aluminum angle that is one inch by one inch and one-eighth inch thick. Fastened to the top surface of the aluminum angle frame 43 are a plurality of the slats 37. These slats 37 are secured to the top of the angle frame 43 by suitable screws such as screws 39. The slats 37 are one-quarter inch thick, have a slightly convex top surface, and are spaced apart not less than one-half inch nor more than three-quarters of an inch. The media tray 41 may also be made as a molded plastic tray like the tray 33.

The dimensions of the media trays 33, 41 are critical to the successful operation of the tower 11.

In stacking the media trays 33, 41 in the tower 11, it is essential that the slats of alternate courses of trays be parallel so as to avoid an uninterrupted downward flow of gasoline-water in the tower. That is to say, with the slats of one media tray oriented in one direction - say, crosswise of the tower 11 - the slats of media trays above and below the one media tray are parallel, but are disposed at right angles to the slats of the one media tray.

The media trays 33 41 are fitted very close to the inner surface of the tower 11 so as to prevent gasoline-water mixture and the contaminated potable water from flowing down the wall of the tower 11 and not contacting the media trays. By arranging the media trays of the present invention in an alternating stacked column within the tower, the gasoline-water mixture and the contaminated potable water must contact the present media trays as it falls downward.

The gasoline-water mixture, and the contaminated potable water, contacting the media trays in the tower, creates mechanical transfer units that break up the molecules of gasoline-water mixture and the water and free the volatile constituent gases in gasoline; the principal gases being benzene, toluene and xylene, which are carried upward by the counterflow of air and are exhausted from the top of the tower. The volatile organic chemicals in the contaminated potable water are also liberated and exhausted from the tower. Such gases are then disposed of in accordance with State, Federal and local regulations.

A particular feature and a very important advantage of the present invention is that the media trays of the present invention do not foul as do the small plastic conventional media units. Fouling of conventional media is a very serious problem. When fouling of the media becomes bad enough to reduce the efficacy of the tower to a very low level, it is necessary to shut down the tower, remove the fouled media, clean the fouled media in an acid bath, neutralize the acid in the media, and refill the tower with the cleaned media. This procedure is costly in lost use of the tower, and in labor to remove fouled media, clean the media, and reload the tower.

The present invention avoids the fouling problem and, consequently, is a clear and convincing solution to the fouling question which is so important.

Although the invention has been described herein with a certain degree of particularity, it is understood that other modifications may be made therein without departing from the scope of the present invention as defined by the following claims.

What is claimed is:

1. An apparatus for removing the volatile constituents from a gasoline-water mixture and the volatile chemicals in a contaminated potable water comprising:
    a vertical tower having an upper end and a lower end;
    a support in said tower spaced apart from a base on which said tower stands;
    means for introducing the gasoline-water mixture and the contaminated potable water into said upper end of said tower and flowing said mixture and water downwardly therein;
    means for flowing an upward counter current of air in said tower;
    a plenum created between said support and said base on which said tower stands;
    said means for flowing including a forced air blower situated adjacent said plenum and being fluidly interconnected therewith;
    a plurality of media trays stacked in courses on said support, said media trays being disposed in close proximity to the inner wall surface of said tower;
    each media tray comprising a frame that is angle-shaped and is one inch by one inch by one-eighth inch thick, having on the top surface of said frame a plurality of slats, each slat being one and one-half inches wide and one-quarter inch thick, said slats being spaced apart not less than one-half inch nor more than three-quarters of an inch and having a slightly convex top surface;
    said slats being situated allowing said upward counter current of air to pass thereby and therethrough;
    means for exhausting said air and the entrained liberated volatile constituents from said mixture and from said water; and
    means for removing precipitate from the bottom of said tower.

2. The apparatus of claim 1 wherein each media tray is circular in shape.

3. The apparatus of claim 1 wherein each media tray is rectangular in shape.

4. The apparatus of claim 1 wherein the media trays of alternate courses are so stacked that their slats are parallel and the slats of each intermediary course above and below are parallel, but are disposed at ninety degrees to slats of trays of said alternate courses.

5. The apparatus of claim 1 wherein the tower is made of aluminum, fiberglass plastic or stainless steel.

6. A method for removing the volatile constituents from a gasoline-water mixture comprising:
    flowing the gasoline-water mixture downwardly in a tower having an upper end and a lower end;
    contacting the mixture with a plurality of courses of media trays stacked on a support in said tower, said support being spaced apart from a base on which said tower stands, so that said volatile constitutents is liberated from said gasoline-water mixture;
    making each media tray a frame that is angle-shaped and is one inch by one inch by one-eighth inch thick and has a plurality of one-quarter inch thick slats on the top of said frame, said slats being one and one-half inches wide and spaced apart not less than one-half inch nor more than three-quarters inch from adjacent slats;
    flowing a current of air upwardly through said media trays, by and between said slats, from beneath said support by means of a forced air blower interconnected with a plenum located between said support and said base and defined within said support, which air entrains the volatile constituents liberated from said gasoline-water mixture;

removing from said tower the air and the entrained volatile constituents;

arranging said media trays such that the slats of alternate courses are parallel;

and arranging said media trays such that the courses intermediate said alternate courses are parallel, but are disposed angularly with respect to the slats of said alternate courses so that there is no continuous downward uninterrupted flow path for said gasoline-water mixture.

* * * * *